US009324204B2

(12) United States Patent
Naghi et al.

(10) Patent No.: US 9,324,204 B2
(45) Date of Patent: Apr. 26, 2016

(54) SECURE CHARGING STATIONS AND METHODS FOR OPERATING THE SAME

(71) Applicants: Herschel A. Naghi, Beverly Hills, CA (US); Elena Naghi, Beverly Hills, CA (US)

(72) Inventors: Herschel A. Naghi, Beverly Hills, CA (US); Elena Naghi, Beverly Hills, CA (US)

(*) Notice: Subject to any disclaimer, the term of this patent is extended or adjusted under 35 U.S.C. 154(b) by 36 days.

(21) Appl. No.: 14/147,768

(22) Filed: Jan. 6, 2014

(65) Prior Publication Data

US 2015/0194001 A1    Jul. 9, 2015

(51) Int. Cl.
*G08B 13/14* (2006.01)
*G07C 9/00* (2006.01)
*H02J 7/00* (2006.01)
*G07F 15/00* (2006.01)

(52) U.S. Cl.
CPC ........ *G07C 9/00134* (2013.01); *G07C 9/00142* (2013.01); *G07C 9/00158* (2013.01); *G07F 15/006* (2013.01); *G08B 13/149* (2013.01); *G08B 13/1436* (2013.01); *G08B 13/1472* (2013.01); *H02J 7/0047* (2013.01); *H02J 2007/0001* (2013.01)

(58) Field of Classification Search
CPC .......... G07C 9/00134; G07C 9/00158; G07C 9/00142; G08B 13/22; H02J 7/0047
USPC .................................................... 340/568.1
See application file for complete search history.

(56) References Cited

U.S. PATENT DOCUMENTS

| 2005/0104555 | A1* | 5/2005 | Simmonds-Short .......... 320/107 |
| 2011/0145073 | A1* | 6/2011 | Richman et al. ........... 705/14.66 |
| 2012/0126745 | A1* | 5/2012 | Partovi .................. H02J 7/0027 320/108 |
| 2013/0132307 | A1* | 5/2013 | Phelps et al. .................. 705/412 |

* cited by examiner

*Primary Examiner* — Kerri McNally
(74) *Attorney, Agent, or Firm* — Burch Dallmann LLP

(57) ABSTRACT

A secure charging station for portable electronic devices (PEDs) may include plurality of individual charging substations, each with an associated charging port, PED sensing area and authentication system. The PED sensing area includes one or more sensors sensing the presence and/or absence of the PED. The authentication system permits a PED owner to enter authentication information, such as a four-digit code via keypad, or information on a credit card, to initiate a secure mode in which unauthorized removal of the PED will trigger an alarm. When in the secure mode, the charging station may display a signal to notify unauthorized persons that tampering or removal of a corresponding PED from the sensing area will trigger an alarm. When charging is complete, or when the owner desires to remove the PED from the secure sensing area, he or she again enters authentication information via the authentication system to cause the PED sensing area to assume an unsecure mode, which permits removal of the PED without the sounding of an alarm.

11 Claims, 2 Drawing Sheets

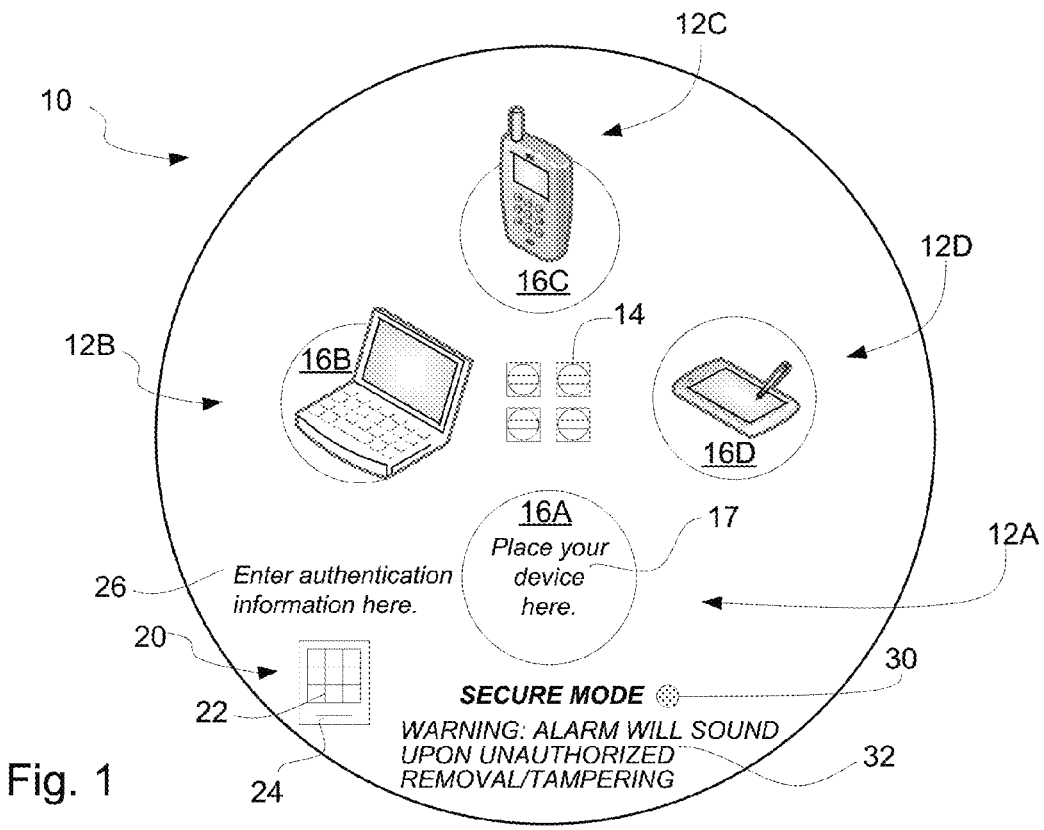
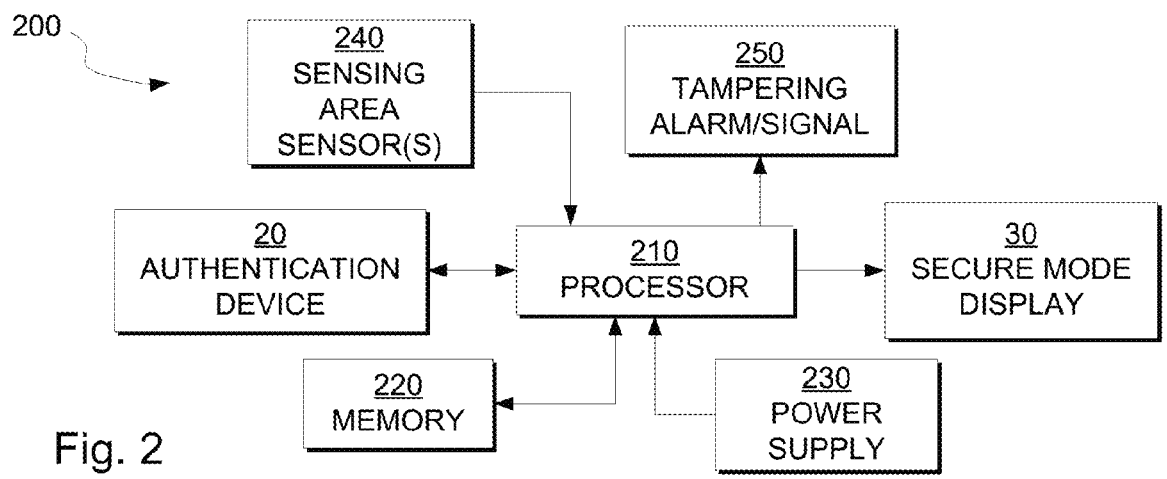

SECURE CHARGING STATIONS AND METHODS FOR OPERATING THE SAME

BACKGROUND

1. Technical Field

The disclosure relates to security systems and devices for portable electronic devices. More particularly, the disclosure relates to security systems for charging stations or other areas where users may leave their portable electronic devices temporarily out of their immediate control, or where such devices may be prone to theft or tampering by unauthorized persons.

2. Prior Art

With the proliferation of portable electronic devices, such as mobile phones and portable computers, there has been a like proliferation of charging stations in locations, such as airports, where users may re-charge their devices while waiting for transportation. Such conventional charging stations may include a kiosk with a number of charging sub-stations, a surface for supporting the devices while charging, and one or more power ports providing power via standard power plug receptacles.

Use of traditional public charging stations may result in an owner of a portable electronic device having to leave their device at a somewhat remote location, out of their immediate control and in an area that is well-travelled by other people who are unknown to and untrusted by a device owner. As such, personal electronic devices left at traditional charging stations are prone to theft and tampering by unauthorized persons.

There is thus a need for security measures for public charging stations or places where people may leave their portable device outside of their immediate control for a period of time. The subject matter of the present disclosure is directed to overcoming, or at least reducing the effects of, the above problems, and others.

SUMMARY OF THE INVENTION

One aspect of the invention provides a secure charging station for portable electronic devices (PED). A charging station may include plurality of individual charging sub-stations, each with an associated charging port, PED sensing area and authentication system. The charging ports may receive a suitable adapter to provide charging power to a respective PED. The PED sensing area includes one or more sensors for sensing parameters, such as weight, touch or electronic signals that correspond to the presence and/or absence of the PED. The authentication system permits a PED owner to enter authentication information, such as a four-digit code via keypad, to initiate a secure mode in which unauthorized removal of the PED will trigger an alarm. When in the secure mode, the charging station may display a signal, such as a "SECURE" LED and associated warnings printed on the station, to notify unauthorized persons that tampering or removal of a corresponding PED from the sensing area will trigger an alarm. When charging is complete, or when the owner desires to remove the PED from the secure sensing area, he or she again enters authentication information via the authentication system to cause the PED sensing area to assume an unsecure mode, which permits removal of the PED without the sounding of an alarm.

The authentication system may incorporate a keypad for entry of a series of digits or alphanumeric data. Alternatively, or in combination, the authentication system may incorporate a magnetic card, such as a credit card reader. The authentication system may also incorporate a biometric information input device.

According to another aspect of the invention, a process for operating a secure charging station includes the steps of prompting an owner for authentication information, instructing the owner to place the PED in the sensing area PED at a charging station, initiating a secure mode of operation in which the secure area is monitored for movement or tampering with the PED, and displaying a secure mode signal to deter others from tampering with or removing the securely charging PED.

Other security measures are contemplated in addition to audible or visual alarms. For example, locking features, such as receptacles for securely containing the PED while charging are contemplated. Such containers or receptacles may be locked and unlocked using the authentication system associated with each charging sub-station.

Aspects of the invention permit owners to leave their PED at a charging station and out of their immediate control while providing a deterrent to theft and tampering.

BRIEF DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIG. 1 is a top view of an exemplary secure charging station according to an aspect of the invention.

FIG. 2 is a schematic diagram of components of a security system for a charging station according to an aspect of the invention.

DETAILED DESCRIPTION

Figure 3:
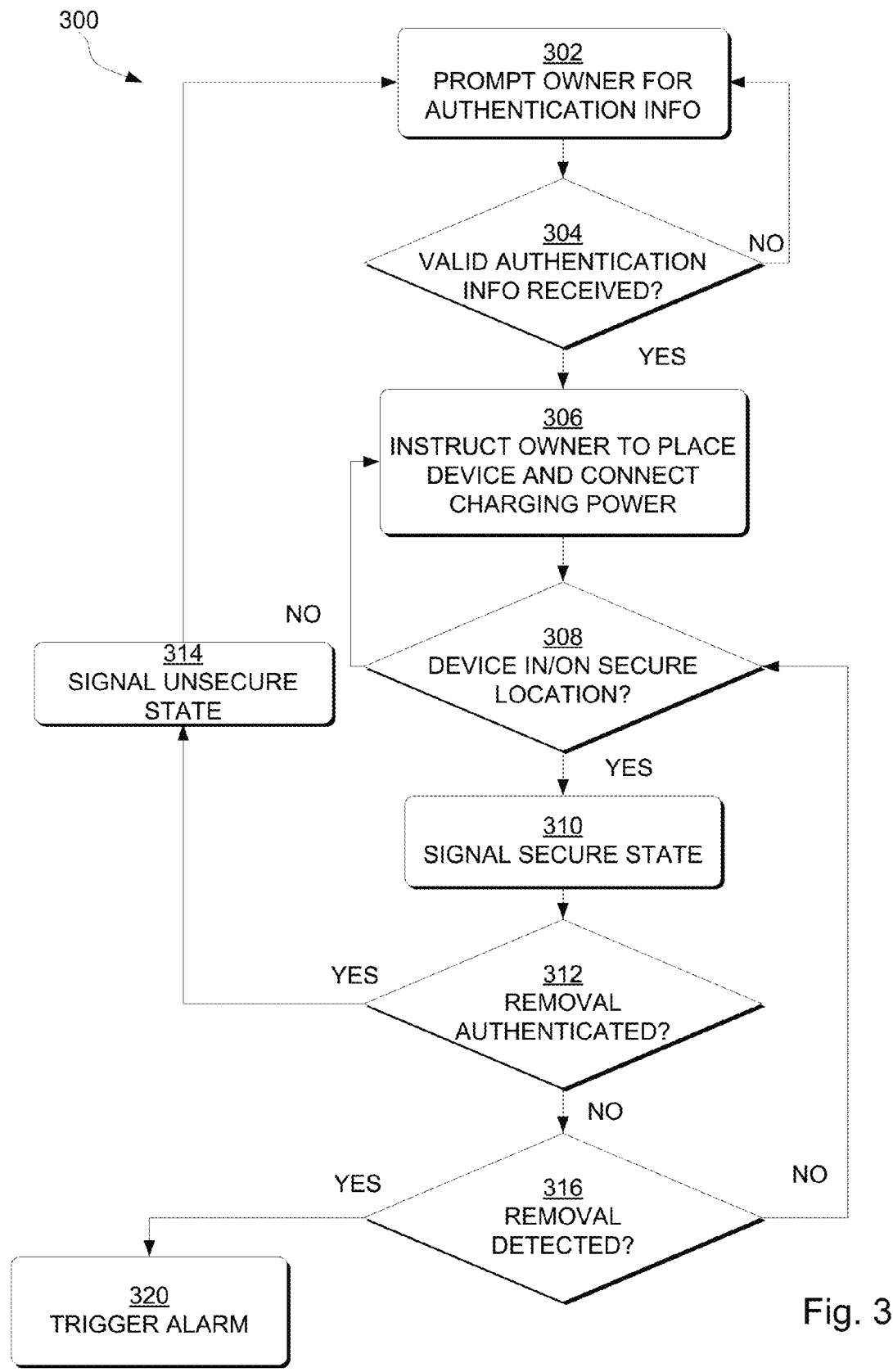
FIG. 3 is a flow chart illustrating steps in an exemplary process for a secure charging station according to an aspect of the invention.

FIG. 1 is a plan view of a secure charging station 100 according to an aspect of the invention. Charging station 10 may take the general form of a table or kiosk and includes a plurality of charging sub-stations 12A-D. Details of charging sub-stations 12B-D have been omitted from FIG. 1 for clarity but it will be understood that each charging substation 12A-D includes the elements described with regard to sub-station 12A. A plurality of power ports 14 are provided, one for each sub-station, to receive an appropriate adapter and electrical conductor (not shown) for providing charging power to respective personal electronic devices (PEDs), such as a laptop computer, tablet computer or smartphone that may be located at each substation 12.

A sensing area 16A-D is associated with each charging sub-station 12A-D. Sensing area may include sensing surface that is equipped to sense the weight, movement or another attribute of a PED placed on or near sensing surface 16. Indicia 17 may be provided to direct PED owners to place their device in the appropriate area on the charging station 10. Sensors may be housed within the table of charging station 10 with appropriate support electronics and processing logic as will be described below. Sensing areas 16 may incorporate other types of sensors, for example, for sensing electronic signatures or electronic activity of respective PEDs placed on or near sensing areas 16.

An authentication device 20 is associated with each charging sub-station 12 and may include a numeric or alphanumeric keypad 20, a magnetic card reader 24, biometric input devices, such as a fingerprint detector (not shown), or any combination thereof. Authentication device 20 permits the owner of a PED to input authentication information, which may be a newly-created passcode generated by the owner via keypad 22, or which may be pre-existing information stored on a card, such as a credit card, which is authorized by the owner. In the case of a credit card, the secure charging station according to aspects of the invention may link to a remote database to verify credit card information and identity of the user/owner as part of the authentication process. Indicia 26 may direct users/owners to input their authentication information.

According to an aspect of the invention, a secure mode indicator 30 may be provided at each charging sub-station 12 and may include a colored LED which designates that the corresponding sub-station 12 is in a secure mode. Indicia 32 may notify the public that an alarm will sound if tampering or removal of the corresponding PED occurs without authorization, thereby providing, in combination with the conspicuous secure mode indicator 30, a deterrent effect.

FIG. 2 is a schematic illustration of components of a secure charging station and their functional relationships. A processor 210 may execute instructions and retrieve and store data in memory 220. Although single components such as authentication device 20 and sensing area sensor(s) 240 are described in FIG. 2, it will be understood that respective authentication devices 20 and other components associated with each charging sub-station 12 may communicate with processor 210 according to a multi-tasking computing architecture. A power supply 230 provides power to processor 210. Authentication device 20 communicates electronically with processor 210 and sends authentication information thereto. Sensing area sensor(s) 240 provide signals to processor 210 corresponding to sensed parameters from sensing areas 16A-D. Processor 210 may provide an activation signal to a tampering alarm or signal 250 and to secure mode display 30.

FIG. 3 illustrates a process 300 for operating a secure charging station according to aspects of the invention. It will be recognized that the exemplary steps may be performed by the logic components, including processor 210 (FIG. 2) according to instructions stored in memory 220 (FIG. 2). At 302, the owner of a PED is prompted to enter authentication information into authentication device 30 (FIGS. 1 and 2). At step 304, a decision is made as to whether or not the authentication information received from the owner is valid. If not, the process returns to step 302. If valid authentication information is entered, the owner is instructed, at 306, to place their PED in the corresponding sensing area 16 (FIG. 1) and connect their device to the charging port 14. At step 308, a determination is made as to whether or not the device has been placed in the sensing area. This determination may involve input from the sensing area sensors 240 (FIG. 2). The system may provide a predetermined period of time to permit the owner to place their device in the appropriate sensing area. At 308, if the PED is not sensed at the sensing area, the process returns to step 306 to continue to prompt, or reprompt, the owner to place the PED in the secure location. If the device is sensed at the secure location (sensing area 16) at 308, the process proceeds to step 310, wherein the secure mode is signaled, for example, by activating the secure mode LED 30 (FIG. 1).

Process 300 then checks, at 312, if the owner has again authenticated, indicating that removal of the secured PED is desired. If so, at step 314 the secure mode signal is deactivated and the process returns to 302 to prompt another user/owner for input. If at step 312 removal has not been authenticated, the process determines at 316 whether or not removal or tampering has been detected in the sensing area 16 by sensing area sensors 240. If not, the process returns to step 308 and repeats steps 308 and 310 to continuously check for the presence of the device and to maintain the secure mode signal. If, at step 316, removal is detected, an alarm is triggered at 320.

According to another aspect of the invention, locking elements may be provided to secure the PED in place, such as by way of a receptacle or housing that may be locked and unlocked based on owner authentication in the same way that secure mode indicator 30 is activated.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the claims that follow.

What is claimed is:

1. A secure charging station for charging portable electronic devices in a public location, having at least one changing sub-station comprising:

at least one sensing area associated with each charging sub-station and having a sensing area sensing surface for sensing the presence of a respective portable electronic device on the sensing surface, the at least one sensing area being unenclosed and defined by indicia on a table surface;

an authentication device associated with each charging sub-station for permitting a user to input authenticating information;

a processing logic for activating the at least one sensing area sensing surface to sense removal or tampering of the at least one portable electronic device in response to an owner entering authenticating information via the authentication device; and the secure charging station further comprising a secure mode indicator for indicating that the at least one sensing area is in a secure mode of operation, the secure mode indicator being visible on the table surface.

2. A process for operating a secure charging station comprising:

receiving authentication information from an owner of a portable electronic device;

providing a predetermined period of time to permit an owner to place their portable electronic device in a sensing area, the sensing area having a sensing surface and being defined by indicia on a table surface, the sensing area being unenclosed;

activating the sensing area on the secure charging station in response to receiving the authentication information;

sensing the presence of the portable electronic device using the sensing area sensing surface to secure the portable electronic device relative to the charging station; and monitoring the sensing area sensing surface to detect movement or tampering with the portable electronic device.

3. The process of claim 2, further comprising the step of activating a secure mode indicator visible on the table surface in response to receiving authentication information from an owner and in response to determining that the personal electronic device is in a secure location on the sensing area sensing surface.

4. The process of claim 2, further comprising the step of deactivating the sensing area in response to receiving authentication information from the owner.

5. The process of claim 2, further comprising the step of receiving authentication information from a keyboard.

6. The process of claim 2, further comprising the step of receiving the authentication information from a credit card reader.

7. The process of claim 2, further comprising the step of sounding an alarm in response to unauthorized removal or tampering with a portable electronic device.

8. A secure charging station for charging portable electronic devices in a public location comprising:
- at least one respective sensing area sensing surface defined on the charging station and having a secure mode in which the at least one sensing area sensing surface detects a portable electronic device, the sensing area sensing surface being defined by indicia on a table surface;
- a respective authentication device cooperatively associated with the at least one respective sensing area sensing surface for receiving authentication information from an owner of the portable electronic device;
- a secure mode indicator on the table surface associated with the at least one sensing, area sensing a surface for indicating that the at least one sensing area sensing surface is in a respective secure mode;
- an alarm associated with the at least one respective sensing area sensing surface; and
- processing logic operable to:
  a) Activate the secure mode and the secure mode indicator of the at least one sensing area sensing surface in response to the authentication device receiving authentication information from the owner;
  b) Selectively trigger the alarm associated with the at least one sensing area sensing; surface if removal of the portable electronic device from the sensing area sensing surface is detected while the sensing area sensing surface is in the secure mode.

9. The secure charging station of claim 8, further comprising at least one power port for receiving a charging adapter for the portable electronic device.

10. The secure charging station of claim 9 further comprising a weight sensor associated with the at least one sensing area sensing surface for sensing the weight of the portable electronic device.

11. The secure charging station of claim 8, wherein the authentication device comprises a credit card reader.

\* \* \* \* \*